United States Patent Office 3,276,635
Patented Oct. 4, 1966

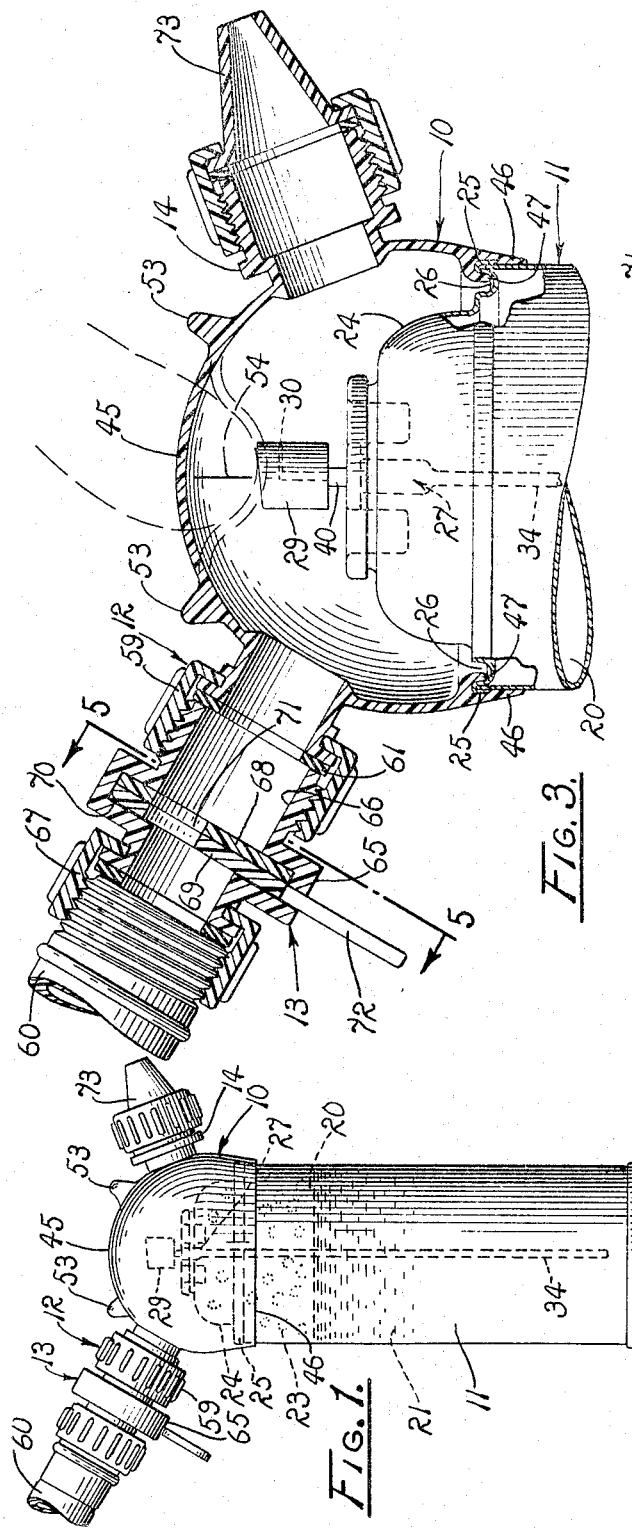

3,276,635
DEVICE FOR DISPENSING AN ADDITIVE FLUID
INTO A CARRIER FLUID
David F. Webster, Fresno, Calif., assignor of ten percent
each to Donald J. Wheeler and Robert W. Nelson, both
of Fresno, Calif.
Filed Aug. 18, 1964, Ser. No. 390,400
5 Claims. (Cl. 222—145)

The present invention relates to a device for dispensing an additive fluid into a carrier fluid and more particularly to such a device which comingles a pressurized flow of either gaseous or liquid additive fluid with a pressurized flow of either gaseous or liquid carrier fluid in predetermined proportions and discharges the combined fluid under pressure and at a controlled flow rate.

In the mixing of gaseous or liquid fluids with additives preparatory to application to surfaces, substances or to the permeation of spaces, various techniques and mechanisms have been utilized. For enterprises undertaken at a commercial level and involving large volumes of fluids, effective procedures have been developed utilizing quantities of pre-mixed fluids and elaborate and relatively complex applicator systems. The expense of such operations and the equipment necessary therefor renders them impractical for use in many operational environments and economic conditions. Generally, such equipment is not susceptible to simplification for small capacity operation.

For the individual user, small-scale, hand-operated devices have proved effective providing mechanical means of spraying pre-mixed fluids, such as paint. However, these require supplementary pressure sources and have proved difficult to clean and to maintain. Furthermore, they require substantial preparation, as well as appreciable knowledge and skill for their effective use.

Pressurized hand-operated fluid dispensers producing sprays of various fluid substances, such as paint, varnish, preservatives, insecticides, fungicides, deodorants, wax, cleansing fluids, and the like, long have been marketed in large quantities and with appreciable success. However, these dispensers contain relatively limited quantities of previously prepared fluids which essentially are adapted to instant application upon discharge without the possibility of alteration to serve varying purposes. Such dispensers have not heretofore made provision for mixing their contents with other fluids for joint utilization. Further, such hand-operated dispensers produce sprays having relatively limited range and, therefore, are only suitable for spray application in proximity thereto.

The dispensing device of the present invention was designed for hand operation in the admixing of a spray wax with a stream of water supplied by a garden hose, as for washing and waxing an automobile or the like, and is conveniently described in such embodiment. It is to be understood that the dispensing device can be used to dispense additive fluids with carrier fluids of a wide variety so long as such fluids are flowable. For instance, the device may be used to mix and discharge under pressure combined liquid or gaseous streams, such as a solvent or a detergent with oil; two or more commercial chemical fluids forming various types of insecticides or fungicides; a solvent with steam; a deodorant with an insecticide or disinfectant; and suspended colloidal particles, or a powder, with a gas; and creosote or an insecticide with an air stream. Many other combinations of fluid or flowable materials will occur to those skilled in the art.

Therefore, it is an object of the present invention to provide a device for mixing and dispensing an additive fluid in a carrier fluid.

Another object is to provide such a device which combines and mixes a pressurized flow of either gaseous or liquid additive fluid with a pressurized flow of either gaseous or liquid carrier fluid in predetermined proportions and automatically discharges the combined fluid under pressure and at a predetermined flow rate.

Another object is to provide such a device of simple and economical structure.

Another object is to provide such a device which may be prepared for use and manually operated with a minimum of time and effort.

Another object is to provide such a device which is manually operable to inject an additive fluid into a pressurized carrier fluid and which discharges the combined carrier fluid without any substantial loss of pressure.

Another object is to provide such a device adapted for use with all types of additive and carrier fluids, whether they be liquids, gases, or a suspension of colloidal solids.

Another object is to provide such a device which combines a conventional hand-operated pressurized fluid dispenser with the outlet of a conduit carrying fluid under pressure and mixes their respective fluids in predetermined proportions and discharges their combined flows at a selected flow rate.

Another object is to provide such a device which mixes the short-range discharge spray of a fluid dispenser with a carrier fluid and is capable of discharging the mixed fluid at substantially increased distances.

These, and other objects and advantages will become more fully apparent upon reference to the following description and accompanying drawing.

In the drawing:
FIG. 1 is a side elevation of a fluid dispensing device embodying the principles of the present invention having a garden hose connected thereto as a source of carrier fluid.
FIG. 2 is a top view of the fluid dispensing device of FIG. 1.
FIG. 3 is a vertical longitudinal section of the dispensing device taken in a plane represented by line 3—3 of FIG. 2.
FIG. 4 is a vertical longitudinal section of a dispenser valve assembly utilized in the device of FIG. 2, taken in a plane represented by line 4—4 thereof and showing the valve in an opened position.
FIG. 5 is a transverse diagonal section of the dispensing device of FIG. 3 taken in a plane represented by line 5—5 thereof and showing the operative parts of a shroud inlet valve of the present invention with the valve member rotated into a partially closed position.

Referring more particularly to the drawing, an illustrative embodiment of the present invention consists generally of a hollow shroud 10 fitted in fluid sealing engagement over the valved top end of a pressurized dispenser 11. The shroud provides a carrier-water inlet fitting 12 having an inlet port therethrough and a removable valve attachment 13 and an outlet fitting 14 providing an outlet port.

Although any suitable pressurized dispenser may be utilized, it conveniently takes the form of a well-known spray can having a tank or container 20 confining a liquid wax 21 in the internal chamber thereof and having a predetermined initial upper surface below the top of the container. A compressed gas 23, such as Freon, is constrained within the container in the space above the liquid wax and exerts a downward force thereupon. Such compressed gas is illustrative of suitable resilient means for expelling the liquid wax or other material. The top of the container is closed by a cap 24 which outwardly overlaps the container to form a circumscribing bead 25 and provides an upwardly disposed annular groove 26 inwardly adjacent thereto. A valve assembly 27 is seated in hermetically sealed engagement in the cap 24 and provides a valved passageway 28 communicating between the interior of the container 20 and the atmosphere when the passageway is opened. The passageway exits to atmosphere through a valve actuator 29, to be described, which provides an atomizer nozzle 30 adapted to convert a pressurized flow of discharging liquid wax into a fine spray. An elongated discharge tube 34 extends from the valve passageway to the bottom portion of the container and provides fluid communication therebetween. It is secured to the valve assembly at the mouth of the passageway in hermetically sealed engagement so as to prevent escape of the compressed gas 23 to the atmosphere.

The structure of the valve assembly 27 consists conventionally of a downwardly disposed resilient annular seat 35 circumscribing the passageway 28 and a substantially cylindrically upwardly spring-biased valve member 36 having axially aligned ribs 37. A notched annular ring 38 circumscribes the valve member and provides openings for the passage of fluid. The valve member normally is engaged against its seat and forms a fluid-tight seal effectively to block the discharge of the liquid wax 21. It is held securely in this position both by a compression spring 39 and the force of the pressurized liquid in the discharge tube 34.

The valve actuator 29 is of the push-button type and is mounted for reciprocative movement above the valve member 36. It includes a downwardly projecting slotted tubular portion 40 adapted to engage the valve member and, upon application of a downward force, to force it away from the valve seat 35. When the actuator is thus motivated, the slotted opening 41 is disposed in registry with the discharge passageway 28 and serves to open the passageway. Thus, upon depressing the push-button actuator, the pressurized liquid wax 21 commences to discharge through the passageway and out the nozzle 30 in a fine spray under the impelling force of the Freon.

The shroud 10 provides an internal chamber and has the general shape of a hollow hemisphere, although any other practical shape may be utilized, such as a hollow cube or polyhedron, not shown. It is formed of any suitable material compatible in use with the particular fluids involved, however, the central portion 45 is resiliently flexible and adapted to be collapsed by finger pressure to actuate the valve assembly 27. It has been found satisfactory to utilize a shroud formed entirely of a resiliently flexible plastic, such as polyethylene. The shroud with its fittings 12 and 14 are preferably cast as a single unit so as to prevent leakage. However, it is has also proven satisfactory to cast the inlet and outlet fittings separately for subsequent bonded or adhesive attachment to the shroud.

The edge of the shroud 10 forms two annular concentric outer and inner lips 46 and 47, respectively. The outer lip 46 is adapted to fit snugly over the upper portion of the dispenser 11 in fluid-tight engagement therewith with the inner lip 47 extended into the annular groove 26. When the shroud is properly fitted, the outer lip 46 is constricted about the bead 25 and adjacent side wall of the dispenser top.

In order to prevent accidental actuation of the valve assembly 27 during packing and shipping of the dispensing device, the central portion 45 of the shroud 10 is preferably provided with integral upwardly projecting nubs 53 spaced eccentrically of the valve actuator 29. These serve to concentrate external forces, accidentally imposed thereon, at selected points remote from the line of application 54 of the valve actuator. Thus, if the shroud of an assembled unit comes into contact with the wall of its shipping carton, not shown, during transit, the dispensing device will not be prematurely activated.

The carrier-water inlet fitting 12 is provided with a conventionally rotatable, threaded female coupling 59 adapted for connection to a standard garden hose 60 with an interposed gasket washer 61 to avoid leakage. For convenience of operation, the manually operated valve attachment 13 is also provided. A suitable type of valve for this purpose is shown in FIGS. 3 and 5 and consists of a valve housing 65 having a threaded male outlet 66 and a threaded female inlet 67. The internal passageway of the housing is partially blocked by a semicircular web 68. A valve member 69 is seated in an annular groove 70 circumscribing the internal chamber for rotation therein contiguously with the web. The valve member corresponds in shape and size to the cross-sectional area of the unblocked passageway 71 and is adapted by its rotational movement selectively and gradually to open and to close the passageway. A valve handle 72 extends radially from the valve member and externally of the housing for convenient manipulation. For operation, the valve attachment is screwed into the inlet fitting and the male outlet of the water hose is in turn screwed into the female inlet of the attachment.

The shroud outlet provides a threaded male fitting 14 adapted to receive any suitable water nozzle 73 or, alternatively, a female hose connection if a more remote discharge is desired.

OPERATION

The operation of the described embodiment of the subject invention is believed to be readily apparent and is briefly summarized at this point.

If the subject device has not been assembled, this is readily accomplished by placing the shroud 10 over the wax dispenser 11 and working the lips 46 and 47 downwardly to fit snugly about the top edges of the dispenser. A garden hose 60 is then secured to the valve attachment 13 and in turn to the inlet fitting 12 of the shroud. The outlet nozzle 73 is secured to the shroud outlet fitting 14, if desired. The water supply is then turned on and the shroud inlet valve member 69 is manually adjusted to obtain the desired spray pattern for the carrier-water stream, not shown. The device is now ready for application of the wax 21.

By application of finger pressure through the shroud 10, as shown in FIG. 3, the push-button actuator 29 is manipulatable as desired. Liquid wax is thereby mixed with the water in the shroud and automatically carried out the shroud outlet nozzle 73 without loss of pressure and for application as desired. If the carrier stream needs adjusting, the inlet valve member 69 is conveniently manipulated to give the desired spray pattern. Upon completion of the desired application, the finger pressure on the shroud is removed thus releasing the push-button actuator to terminate the wax discharge. The inlet valve may then be conveniently closed to stop the carrier water flow or the water supply may otherwise be interrupted.

In view of the foregoing, it is readily apparent that a simple and economical device has been provided which mixes an additive fluid with a carrier fluid in predetermined proportions and automatically discharges the combined fluids under pressure and at a predetermined flow rate. The device is manually operable and is adapted for use with all types of compatible additive and carrier fluids.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. The combination of
   (A) a pressure container having
      (1) an additive fluid therein,
      (2) resilient means for propelling the additive fluid from the container, and
      (3) a discharge valve manipulable to release said additive fluid from the container, and
   (B) means mounted on the container defining a chamber housing the discharge valve and having (1) an inlet port for carrier fluid in communication with the chamber, and
(2) an outlet port for carrier fluid in communication with said chamber,
(3) said container mounted means being adapted for operation of the valve by manipulation of the container mounted means to release additive fluid into the chamber.

2. A device for dispensing an additive fluid into a carrier fluid comprising:
(A) a pressure container having
(1) an additive fluid and a gas constrained under pressure in the container, and
(2) a discharge valve adapted on actuation to emit the additive fluid from the container under the impelling force of the gas;
(B) flexible means mounted on the container defining a chamber in which the valve is enclosed and a path of travel through the chamber for the carrier fluid, and
(C) means for directing carrier fluid through the chamber,
(1) said valve being manipulable by flexing the flexible means to release additive fluid from the container into the chamber and the carrier fluid.

3. A device for dispensing an additive fluid into a carrier fluid comprising a pressure container having such an additive fluid and a gas under pressure therein, and a discharge valve manipulable to discharge the additive fluid impelled by the gas under pressure; and a shroud of flexible material mounted on the container in covering relation to the discharge valve, the shroud defining a chamber in which the discharge valve is disposed and being adapted to be distorted by external manual pressure to operate the valve, the shroud having a carrier fluid admitting port and an exhaust port whereby carrier fluid can be directed through said chamber.

4. An auxiliary attachment for a pressure container having a fluid and a gas under pressure therein and a discharge valve manipulable to release the fluid under propulsion of the compressed gas comprising a flexible shroud having an opening circumscribed by an edge adapted for constriction about the container in substantially fluid-tight engagement therewith to define a chamber enclosing the discharge valve, said shroud having an inlet port in communication with the chamber adapted to receive a carrier fluid, and an outlet port opening from the chamber for discharge of such carrier fluid, the discharge valve being manipulable from externally of the shroud by flexing the shroud.

5. An auxiliary attachment for a pressure container having a fluid and a gas under pressure therein and a discharge valve manipulable to release the fluid under propulsion of the compressed gas comprising a shroud having an opening circumscribed by an edge adapted for constriction about the container in substantially fluid-tight engagement therewith to define a chamber receiving the discharge valve, an inlet fitting mounted on the shroud providing a port therethrough into the chamber and adapted for connection to a source of carrier fluid, and an outlet fitting mounted on the shroud providing a port therethrough in communication with the chamber for discharge of the carrier fluid, the shroud being flexible and the discharge valve being manipulable therethrough by collapsing the shroud thereagainst.

References Cited by the Examiner

UNITED STATES PATENTS

| 549,678 | 11/1895 | Miller. |
| 2,574,036 | 11/1951 | Henchert. |
| 3,052,417 | 9/1962 | Daniel _____ 222—145 X |
| 3,058,626 | 10/1962 | Hibbs et al. _____ 222—184 |

ROBERT B. REEVES, *Primary Examiner.*

LOUIS J. DEMBO, *Examiner.*

F. R. HANDREN, H. S. LANE, *Assistant Examiners.*